United States Patent
Chang et al.

(10) Patent No.: US 8,291,301 B2
(45) Date of Patent: Oct. 16, 2012

(54) DATA TRANSFER METHOD CAPABLE OF SAVING MEMORY FOR STORING PACKET IN USB PROTOCOL AND APPARATUS THEREOF

(75) Inventors: Tso-Hsuan Chang, Taipei County (TW); Ming-Hsu Hsu, Taipei (TW); Teng-Chuan Hsieh, Taipei County (TW)

(73) Assignee: Etron Technology, Inc., Hsinchu (TW)

( * ) Notice: Subject to any disclaimer, the term of this patent is extended or adjusted under 35 U.S.C. 154(b) by 435 days.

(21) Appl. No.: 12/770,705

(22) Filed: Apr. 29, 2010

(65) Prior Publication Data

US 2010/0287456 A1   Nov. 11, 2010

Related U.S. Application Data

(60) Provisional application No. 61/176,479, filed on May 7, 2009.

(30) Foreign Application Priority Data

Oct. 15, 2009  (TW) ............................... 98134939 A

(51) Int. Cl.
H03M 13/00  (2006.01)

(52) U.S. Cl. ........................................ 714/776; 711/147

(58) Field of Classification Search .................. 714/776; 711/147
See application file for complete search history.

(56) References Cited

U.S. PATENT DOCUMENTS

| | | | |
|---|---|---|---|
| 6,185,641 B1* | 2/2001 | Dunnihoo | 710/56 |
| 7,596,155 B2* | 9/2009 | Hsiao | 370/506 |
| 8,121,148 B2* | 2/2012 | Olderdissen | 370/469 |
| 2005/0120163 A1* | 6/2005 | Chou et al. | 711/103 |
| 2010/0211705 A1* | 8/2010 | Alcouffe et al. | 710/33 |

* cited by examiner

*Primary Examiner* — Philip Guyton
(74) *Attorney, Agent, or Firm* — Winston Hsu; Scott Margo

(57) ABSTRACT

A data transfer method is utilized for saving memory for storing packet in USB protocol. When a transmitter is to send a payload, the protocol layer of the transmitter writes the payload into a shared payload memory. The protocol layer generates a corresponding header according to the payload, and writes the corresponding header into a shared header memory. The data-link layer of the transmitter generates a packet by means of directly combining the payload saving in the shared payload memory and the header saving in the shared header memory, and sends the packet. Hence, when the transmitter is to send the payload, the transmitter only requires a memory of which the size is equal to a packet. In this way, the memory can be saved, reducing the cost.

35 Claims, 12 Drawing Sheets

DATA TRANSFER METHOD CAPABLE OF SAVING MEMORY FOR STORING PACKET IN USB PROTOCOL AND APPARATUS THEREOF

CROSS REFERENCE TO RELATED APPLICATIONS

This application claims the benefit of U.S. Provisional Application No. 61/176,479, filed on May 7, 2009 and entitled "Innovative method of reducing data memory at USB3.0". The contents of which are incorporated herein.

BACKGROUND OF THE INVENTION

1. Field of the Invention

The present invention is related to a data transfer method, and more particularly, to a data transfer method that is able to save memory used for storing packets in the Universal Serial Bus (USB) protocol.

2. Description of the Prior Art

Please refer to FIG. 1. FIG. 1 is a diagram illustrating the packet format of a packet DP of USB 3.0 standard. As shown in FIG. 1, the packet DP comprises a header H and a payload P. The header H comprises a type information TP, an end point information EP, a link command word LW, a header error checking code $CRC_H$, and a reserved section RA. The payload P comprises a data sector D and a data error checking code $CRC_D$.

The type information TP can be utilized to determine the packet type of the packet DP; packet type, for instances, specifies the packet is of handshake or data etc. Endpoint information EP can be utilized to determine the transfer type of the packet DP; for instances, USB 3.0 standard specifies four transfer types: the control transfer type, the interrupt transfer type, the bulk transfer type and the isochronous transfer type. Each transfer type is utilized to transfer data of different characteristics; the isochronous transfer type, for example, carries out real-time data transfer which is preferred for applications such as voice and video communication, so issues of lagging or delaying can be avoided. The link command word LW is utilized to identify the condition of the data linkage. The link command word further comprises a link command word error checking code $CRC_L$ and a header sequence number HSEQ. The link command word error checking code $CRC_L$ is utilized to determine whether the link command word LW is correct or not. The header sequence number HSEQ is utilized to determine if the packet sequence of which the packet DP is sent/received is correct. The header error checking code $CRC_H$ is utilized to determine whether the header H contains any error. The reserved section RA is utilized to store data defined by the user.

The data sector D provides the actual data transmitted from the transmitter, such as the video data captured from the camera or the data stored in a flash drive. The data error checking code $CRC_D$ is utilized to determine whether the data sector D contains any error. In addition, the data sector D comprises N data $SD_1 \sim SD_N$.

Conventionally, the data transfer via USB protocol involves the transmitter T and the receiver R. The transmitter T can be a host or a device, and the receiver R is a host or device corresponding to the transmitter T. When transferring packets, the transmitter T and the receiver R process data according to sequences from the bottom physical layer PH, the data link layer DL and the upper protocol layer PR. The operations of the receiver R receiving the packet DP and the transmitter T transmitting the packet DP are specified below.

When the receiver R receives the packet DP, the receiver R stores the packet DP in the data link memory DLM of the data link layer DL of the receiver R. When the data link layer DL of the receiver R has determined the header H of the packet DP is correct, the data link layer DL of the receiver R duplicates the packet DP stored in the data link memory DLM to the protocol memory PRM of the protocol layer PR of the receiver R. This way, the protocol layer PR of the receiver R can access packet DP stored in the protocol memory PRM for later uses.

When the transmitter T is transmitting the payload P, the protocol layer PR of the transmitter T generates the header H according to the payload P, as well as generating the packet DP in the protocol memory PRM of the protocol layer PR of the transmitter T according to the header H and the payload P. The transmitter T then duplicates the packet DP stored in the protocol memory PRM to the data link memory DLM of the data link layer DL of the transmitter T. This way, the protocol layer PRM of the transmission T can notify the data link layer DL of the transmitter T to transmit the packet DP stored in the data link memory DLM.

It is obvious that the protocol layer PR and the data link layer DL of both of the transmitter T and the receiver R require memory (i.e. the protocol memory PRM plus the data link memory DLM) to store packets. In other words, when receiving or transmitting the packet DP, one packet DP would occupy the memory space that is twice the size of the packet DP in the receiver R or the transmitter T, respectively. Consequently, the excess usage of memory increases the cost, causing inconvenience to the user.

SUMMARY OF THE INVENTION

The present invention discloses a data transfer method for saving memory when storing packets in USB (Universal Serial Bus) protocol. The data transfer method comprises a receiver receiving a packet transmitted from a transmitter, and storing the packet in a shared memory; a data link layer of the receiver performing error code checking to a header of the packet stored in the shared memory, for obtaining a data link checking result and then accordingly transmitting a protocol layer processing signal to a protocol layer of the receiver; and the protocol layer of the receiver directly processing the packet stored in the shared memory, according to the protocol layer processing signal.

The present invention further discloses a data transfer method for saving memory when storing packets in USB (Universal Serial Bus) protocol. The data transfer method comprises a protocol layer of a transmitter writing a payload into a shared payload memory; the protocol layer of the transmitter generating a header according to the payload, and then writing the header into a shared header memory; and a data link layer of the transmitter directly combining the header stored in the shared header memory and the payload stored in the shared payload memory into a packet, and then transmitting the packet to a receiver.

The present invention further discloses a device for saving memory when storing packets in USB (Universal Serial Bus) protocol. The device comprises a transmitting device and a receiving device. The transmitting device comprises a shared header memory, a shared payload memory, a first protocol layer device, and a first data link layer device. The first protocol layer device is for generating a heater according to a payload, and then storing the payload in the shared payload memory, as well as storing the header in the shared header memory. The first data link layer device is for directly combining the header stored in the shared header memory and the payload stored in the shared payload memory into a packet, and then transmitting the packet. The receiving device is for receiving the packet. The receiving device comprises a shared memory, a second data link layer device and a second protocol layer device. The shared memory is for storing the packet. The second data link layer device is for performing error code checking to the header of the packet stored in the shared memory, for generating a data link checking result, and then transmitting a data link reply signal to the transmitting device as well as generating a protocol layer processing signal according to the data link checking result. The second protocol layer device is for determining whether the packet stored in the shared memory is of an isochronous transfer type, according to the protocol layer processing signal and an end point information of the header of the packet stored in the shared memory.

The present invention further discloses a receiving device for saving memory. The receiving device receives a packet according to a communication protocol. The packet comprises a header and a payload. The receiving device comprises a shared memory, a second data link layer device, and a second protocol layer device. The shared memory comprises a plurality of packet storing units, and a first packet storing unit of the plurality of packet storing units stores the packet and the first packet storing unit corresponds to a first memory address. The second data link layer device is electrically connected to the shared memory, and the second data link layer device reads the packet stored in the first packet storing unit according to the first memory address. The second protocol layer device is electrically connected to the shared memory and the second protocol layer device accesses the packet stored in the first packet storing unit according to the first memory address.

The present invention further discloses a receiving device for saving memory. The receiving device receives a packet according to a communication protocol. The packet comprises a header and a payload. The receiving device comprises a data link memory, a protocol memory, a second data link layer device and a second protocol layer device. The data link memory comprises a plurality of header storing units, a first header storing unit of the plurality of header storing units stores the header of the packet but not the payload of the packet, and the first header storing unit corresponds to a second memory address. The protocol memory comprises a plurality of payload storing units, a first payload storing unit of the plurality payload units stores the payload but not the header of the packet, and the first payload storing unit corresponds to a third memory address. The second data link layer device is electrically connected to the data link memory, the second data link layer device accesses the header of the packet according to the second memory address. The second protocol layer device is electrically connected to the protocol memory and the second protocol layer device accesses the payload of the third memory address.

The present invention further discloses a transmitting device for saving memory. The transmitting device transmits a packet according to a communication protocol. The packet comprises a header and a payload. The transmitting device comprises a first protocol layer device, a shared header memory, a shared payload memory and a first data link layer device. The first protocol layer device is for generating the header of the packet according to the payload of the packet. The shared header memory is electrically connected to the first protocol layer device. The shared header memory comprises a plurality of shared header storing units. A first shared header storing unit of the plurality of shared header storing units stores the header of the packet but not the payload of the packet, and the first shared header storing unit corresponds to a fourth memory address. The shared payload memory is electrically connected to a first protocol layer device. The shared payload memory comprises a plurality of shared payload storing units. A first shared payload storing unit of the plurality of shared payload storing units stores the payload of the packet but not the header of the packet, and the first shared payload storing unit corresponds to a fifth memory address. The first data link layer device is electrically connected to the shared payload memory and the shared header memory. The first data link layer device combines the header and the payload into the packet according to the fourth memory address and the fifth memory address, and then transmits the packet to a receiving device corresponding to the transmitting device.

These and other objectives of the present invention will no doubt become obvious to those of ordinary skill in the art after reading the following detailed description of the preferred embodiment that is illustrated in the various figures and drawings.

DETAILED DESCRIPTION

Therefore the present invention discloses a data transfer method, for both of the protocol layer and the data link layer of the transmitter or the receiver to share the same memory to store packets, so memory spaces can be saved, further reducing the cost.

Figure 1:
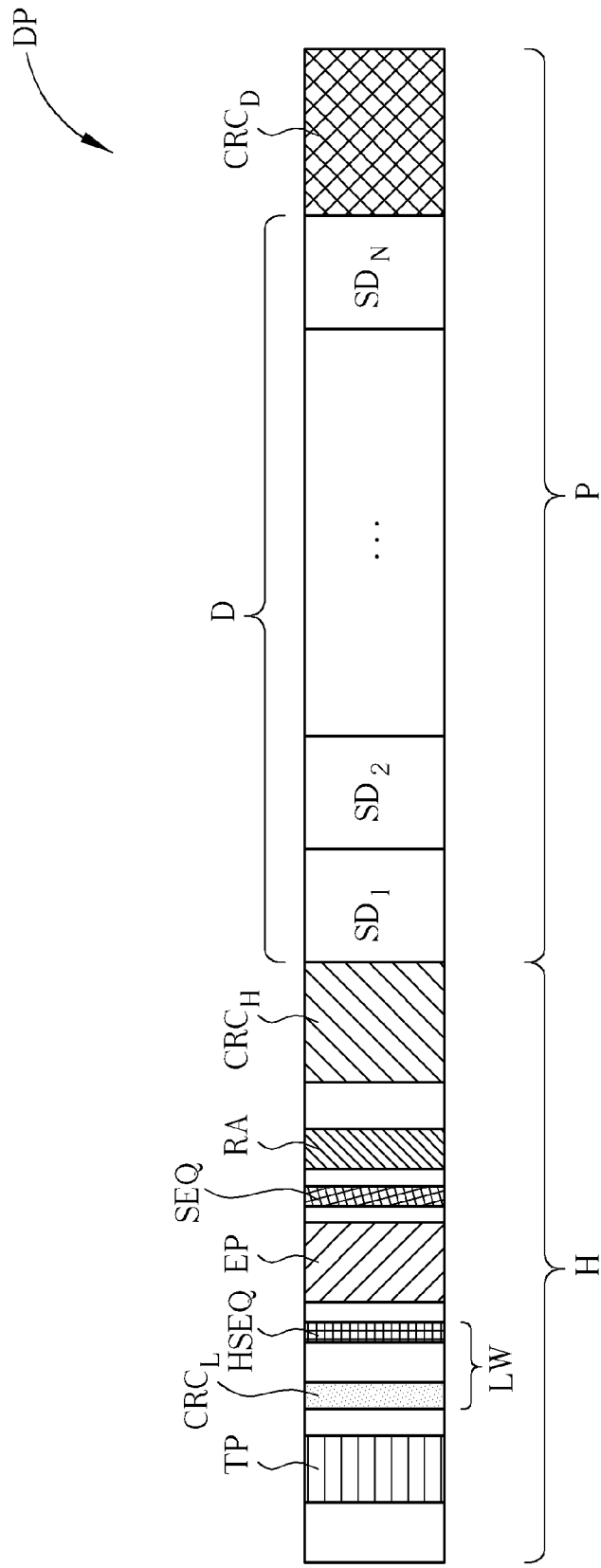
FIG. 1 is a diagram illustrating the packet format of a packet of USB 3.0 standard.
Figure 2:
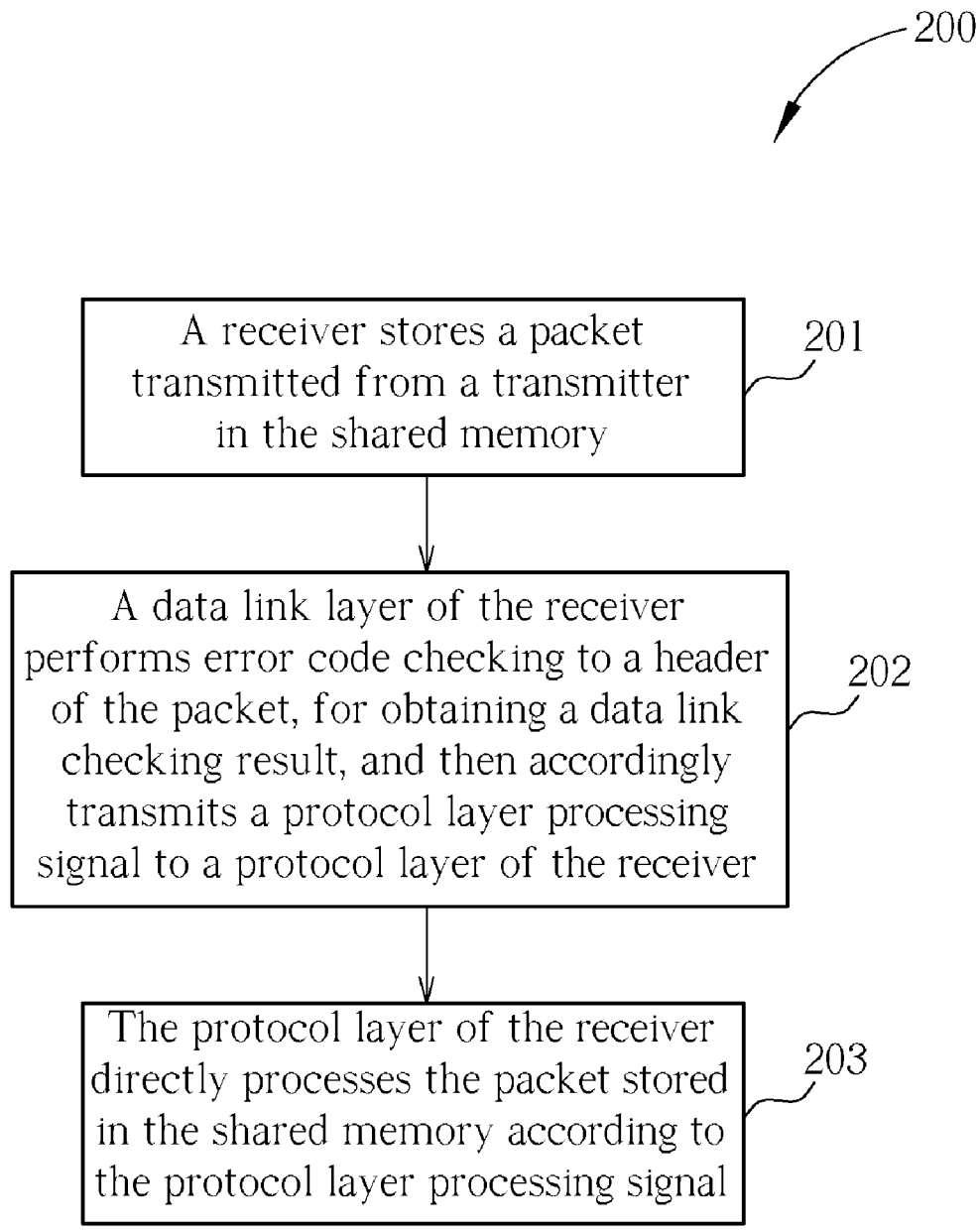
FIG. 2 is a flowchart illustrating the data transfer method for saving memory used to store packets in the USB protocol, according to the first embodiment of the present invention.

Please refer to FIG. 2. FIG. 2 is a flowchart illustrating the data transfer method 200 for saving memory used to store packets in the USB protocol, according to the first embodiment of the present invention. In the data transfer method 200, it is assumed the receiver R is a host or a device, and the transmitter T is a host or device corresponding to the receiver R. The receiver R comprises a physical layer PH, a data link layer DL, a protocol layer PR and a shared memory SHM. The shared memory SHM is utilized to store data. The shared memory SHM comprises packet storing units $DPM_1 \sim DPM_N$ and flags $F_1 \sim F_N$. Packet storing units $DPM_1 \sim DPM_N$ are utilized to store packets. Each of the flags $F_1 \sim F_N$ identifies whether the corresponding packet storing unit $DPM_1 \sim DPM_N$ is available for writing in data. The steps of data transfer method 200 are explained below;

Step 201: The receiver R receives the packet DP transmitted from the transmitter T and then stores the packet DP in the shared memory SHM;

Step 202: The data link layer DL of the receiver R performs error code checking to the header H of the packet DP stored in the shared memory SHM, for obtaining the data link checking result $E_{DL}$, and then accordingly transmits the protocol layer processing signal $S_{PRP}$ to the protocol layer PR of the receiver R;

Step 203: The protocol layer PR of the receiver R directly processes the packet DP stored in the shared memory SHM according to the protocol layer processing signal $S_{PRP}$.

In step 201, when the receiver R receives the packet DP transmitted from the transmitter T, the receiver R searches for the packet storing units available for writing in according to the flags $F_1 \sim F_N$. For instances, when the flag $F_K$ is represented as "write in available", it indicates the packet storing unit $DPM_K$ of the shared memory SHM is available for writing in data; when the flag $F_K$ is represented as "already write in", it indicates that data is already present in the packet storing unit $DPM_K$ of the shared memory SHM and the write in action is prohibited for preventing overwriting the existing data already stored in the packet storing unit $DPM_K$. Assuming the flag $F_K$ is represented as "write in available", the receiver R can write the packet DP into the packet storing unit $DPM_K$ of the shared memory SHM, then the receiver R marks the flag $F_K$ to be "already write in".

In step 202, the data link layer DL of the receiver R performs error code checking to the header H of the packet DP stored in the packet storing unit $DPM_K$ of the shared memory SHM, for obtaining the data link checking result $E_{DL}$. More specifically, the data link layer DL of the receiver R determines whether the header H of the packet DP is correct, according to the link command word error checking code $CRC_L$ and the header error checking code $CRC_H$ of the packet DP. The header error checking code $CRC_H$ of the header H of the packet DP can be Cyclic Redundancy Check 16 (CRC-16), and the link command word error checking code $CRC_L$ can be Cyclic Redundancy Check 5 (CRC-5). The data link layer DL utilizes the link command word error checking code $CRC_L$ and the header error checking code $CRC_H$ to perform cyclic redundancy check to the header H and the link command work LW of the packet DP, respectively. For instances, the cyclic redundancy check of the header H is to divide the header H (including the header error checking code $CRC_H$) with a predetermined divisor $CRC_{DH}$, for obtaining a corresponding remainder $CRC_{RH}$. When the remainder $CRC_{RH}$ equals a predetermined value X (X=0, for example), the checking result $E_H$ indicates the header H of the packet DP is correct; when the remainder $CRC_{RH}$ does not equal the predetermined value X, the checking result $E_H$ indicates the header H of the packet DP is incorrect. The link command word checking result $E_L$ can also be obtained with similar methods.

When one of the checking results $E_L$ and $E_H$ is incorrect, the data link layer DL of the receiver R determines the header H to be incorrect. At the same time, the data link checking result $E_{DL}$ is represented as incorrect, and the data link layer DL of the receiver R transmits resend signal $S_{LBAD}$ to the transmitter T, to notify that the data link checking result $E_{DL}$ of the receiver R for the packet DP transmitted from the transmitter T is represented as incorrect, so the transmitter T can resend the data packet DP. On the contrary, when both of the checking results $E_L$ and $E_H$ are correct, the data link layer DL of the receiver R determines the header H to be correct. At the same time, the data link checking result $E_{DL}$ is represented as correct, and the data link layer DL of the receiver R transmits confirmation signal $S_{LGOOD}$ to the transmitter T, to notify that the data link checking result $E_{DL}$ of the receiver R for the packet DP transmitted from the transmitter T is represented as correct.

On the other hand, when the data link checking result $E_{DL}$ is represented as correct, the data link layer DL of the receiver R transmits protocol layer processing signal $S_{PRP}$ to the protocol layer PR of the receiver R. The protocol layer processing signal $S_{PRP}$ is utilized to indicate the packet address ADDR of the packet storing unit $DPM_K$ of the corresponding shared memory SHM, for the protocol layer PR to access the packet DP stored in the packet storing unit $DPM_K$ of the shared memory SHM for later uses.

In step 203, assuming the packet address ADDR indicated by the protocol layer processing signal $S_{PRP}$ transmitted by the data link layer DL represents "K", so the protocol layer PR can read the data stored in the packet storing unit $DPM_K$ which corresponds to the packet address ADDR, of the shared memory SHM. In other words, the protocol layer PR of the receiver R can read the packet DP stored in the packet storing unit $DPM_K$. Therefore, the protocol layer PR of the receiver R can receive the payload P of the packet DP for later uses, according to the end point information EP of the header H of the packet DP.

Furthermore, the protocol layer PR of the receiver R determines whether the packet DP is of the isochronous transfer type according to the end point information EP of the header H of the packet DP.

When the end point information EP indicates the packet DP to be the isochronous transfer type, the protocol layer PR of the receiver R directly accesses the payload P of the packet DP for later uses. For instances, assuming the payload P is the voice data transmitted from the transmitter T to the receiver R, the receiver R can access the payload P of the packet DP directly, for playing voice according to the voice data of the payload P.

When the end point information EP indicates the packet DP is not of the isochronous transfer type, the protocol layer PR of the receiver R performs cyclic redundancy check to the error checking code $CRC_D$ of the payload P of the packet DP, for obtaining the payload checking result $E_{PL}$ as well as transmitting the ACK packet $S_{ACK}$ to the transmitter T accordingly. The error checking code $CRC_D$ of the payload P can be Cyclic Redundancy Code 32 (CRC-32). The protocol layer PL of the receiver R utilizes the error checking code $CRC_D$ of the payload P to perform cyclic redundancy check, for obtaining the payload checking result $E_{PL}$, wherein the operational principle is similar to that of data link layer DL utilizing the error checking codes $CRC_H$ and $CRC_L$ to perform cyclic redundancy check to the header H and the link command word LW of the packet DP, as mentioned above, so the relative description is omitted hereinafter. When the payload checking result $E_{PL}$, obtained according to the payload error checking code $CRC_D$ is represented as correct, the protocol layer PR of the receiver R transmits the ACK signal $S_{ACK}$ to the transmitter T, wherein the ACK signal $S_{ACK}$ comprises the header sequence parameter HSEQ relative to the packet DP, for the transmitter T to determine the ACK signal $S_{ACK}$ is corresponded to the packet DP according to the header sequence parameter HSEQ; and at the same time the ACK signal $S_{ACK}$ is utilized to notify the transmitter T that the payload checking result $E_{PL}$ corresponding to the packet DP in the receiver R is represented as correct (i.e. meaning the receiver has correctly received the packet DP). On the contrary, when the payload checking result $E_{PL}$ obtained according to the payload error checking code $CRC_D$ is represented as incorrect, the protocol layer PR of the receiver R transmits the ACK signal $S_{ACK}$ to notify the transmitter T that the payload checking result $E_{PL}$ corresponding to the packet DP received by the receiver R is represented as incorrect. This way, the transmitter T is able to identify the packet DP which corresponds to the header sequence parameter HSEQ has not been received correctly by the receiver R according to the header sequence parameter HSEQ, so the transmitter T will resend the packet DP.

According to the above mentioned description of the data transfer method 200 of the present invention, when the receiver R receives the packet DP, the packet DP is stored in a packet storing unit of the shared memory SHM. In other words, when the receiver R receives the packet DP, the receiver R only requires the memory of the size (i.e. identical size as the packet storing unit $DPM_K$) of one packet to store the packet DP. This way, the memory required to store the packet is reduced and the cost can be lowered accordingly.

On the other hand, other embodiments can be derived from the fundamental essence of the data transfer method 200. In another embodiment, each of the packet storing unit $DPM_1$~$DPM_N$ of above mentioned shared memory SHM can be split up into two parts; the first part is for storing the header and the second part is for storing the payload. Further details are explained below.

The shared memory SHM comprises a data link memory DLM and a protocol memory PRM. The data link memory DLM comprises header storing units $HM_1$~$HM_N$. The header storing units $HM_1$~$HM_N$ are utilized to store headers. Each of the header storing units $HM_1$~$HM_N$ comprises the corresponding shared header flags $F_{H1}$~$F_{HN}$. The shared header flags $F_{H1}$~$F_{HN}$ indicates whether the corresponding header storing unit $HM_1$~$HM_N$ are available for writing in data. The protocol memory PRM comprises the payload storing units $PLM_1$~$PLM_N$. The payload storing units $PLM_1$~$PLM_N$ are utilized for store the payload. Each of the payload storing units $PLM_1$~$PLM_N$ comprises the shared payload flags $F_{PL1}$~$F_{PLN}$ respectively. The shared payload flags $F_{PL1}$~$F_{PLN}$ are utilized to indicate whether the corresponding payload storing units $PLM_1$~$PLM_N$ are available for writing in data.

Similar to the step 201, when the receiver R receives the packet DP transmitted from the transmitter T, the receiver R searches for the header storing units available for writing in data according to the shared header flags $F_{H1}$~$F_{HN}$; the receiver R also searches for the payload storing units available for writing in data according to the shared payload flags $F_{PL1}$~$F_{PLN}$. For instances, when the shared header flag $F_{HK}$ is represented as "write in available", it indicates the header storing unit $HM_K$ of the data link memory DLM is available for writing in data; when shared header flag $F_{HK}$ is represented as "already write in", it indicates data is already stored in the header storing unit $HM_K$ of the data link memory DLM and the write in action is prohibited for preventing overwriting the existing data already stored in the header storing unit $HM_K$. The payload storing units that are available for writing in can also be identified by similar methods according to the shared payload flags $F_{PL1}$~$F_{PLN}$, and the relative description is omitted hereinafter.

Assuming both of the shared header flag $F_{HK}$ and the shared payload flag $F_{PLK}$ are represented as "write in available," the receiver R writes the header H of the packet DP into the header storing unit $HM_K$ of the data link memory DLM and writes the payload P of the packet DP into the payload storing unit $PLM_K$ of the protocol memory PRM, then the receiver R marks both of the shared header flag $F_{HK}$ and the shared payload flag $F_{PLK}$ to be "already write in".

Similar to step 202, the data link layer DL of the receiver R performs error code checking to the header H of the packet DP stored in the header storing unit $HM_K$ of the data link memory DLM, for obtaining the data link checking result $E_{DL}$. More specifically, the data link layer DL of the receiver R determines whether the header H of the packet DP is correct, according to the link command word error checking code $CRC_L$ and the header error checking code $CRC_H$ of the packet DP. The data link layer DL utilizes the link command word error checking code $CRC_L$ and the header error checking code $CRC_H$ to perform cyclic redundancy check to the header H and the link command work LW of the packet DP, respectively, for obtaining the corresponding checking results $E_H$ and $E_L$. The operational principle is similar to the above mentioned specification and the relative description is omitted hereinafter.

When one of the checking results $E_L$ and $E_H$ is incorrect, the data link layer DL of the receiver R determines the header H to be incorrect. At the same time, the data link checking result $E_{DL}$ is represented as incorrect, and the data link layer DL of the receiver R transmits the resend signal $S_{LBAD}$ to the transmitter T, to notify that the data link checking result $E_{DL}$ for the packet DP at the receiver R transmitted from the transmitter T is represented as incorrect, so the transmitter T can resend the data packet DP. On the contrary, when the checking results $E_L$ and $E_H$ are both correct, the data link layer DL of the receiver R determines the header H to be correct. At the same time, the data link checking result $E_{DL}$ is represented as correct, and the data link layer DL of the receiver R transmits confirmation signal $S_{LGOOD}$ to the transmitter T, to notify that the data link checking result $E_{DL}$ of the receiver R for the packet DP transmitted from the transmitter T is represented as correct.

On the other hand, when the data link checking result $E_{DL}$ is represented as correct, the data link layer DL of the receiver R transmits protocol layer processing signal $S_{PRP}$ to the protocol layer PR of the receiver R. The protocol layer processing signal $S_{PRP}$ is utilized to indicate the header address $ADDR_H$ which corresponds to the header storing unit $HM_K$ of the data link memory DLM, as well as the payload address $ADDR_{PL}$ which corresponds to the payload storing unit $PLM_K$ of the protocol memory PRM.

Similar to step 203, the protocol layer PR can access the header H of the packet DP stored in the header storing unit $HM_K$ of the data link memory DLM, according to the header address $ADDR_H$ indicated by the protocol layer processing signal $S_{PRP}$ transmitted by the data link layer DL. The protocol layer PR can also access the payload P of the packet DP stored in the payload storing unit $PLM_K$ of the protocol memory PRM, according to the payload address $ADDR_{PL}$ indicated by the protocol layer processing signal $S_{PRP}$ transmitted by the data link layer DL. Therefore, after the protocol layer PR has combined the header H and the payload P into the packet DP, the protocol layer PR determines if the packet DP is of the isochronous transfer type according to the end point information EP of the header H of the packet DP, and processes the packet DP for later uses. The processing method is similar to that of the above mentioned, so the relative description is omitted hereinafter.

Therefore, in the present embodiment, when the receiver R has received the packet DP, the header H of the packet DP is stored in a header storing unit of the data link memory DLM, and the payload P of the packet DP is stored in a payload storing unit of the protocol memory DLM. In other words, when the receiver R has received the packet DP, the receiver R only requires the memory of the size (i.e. size of the header storing unit $HM_K$ plus the payload storing unit $PLM_K$) of one packet for storing the packet DP. This way, the memory required to store the packet is reduced and the cost is lowered accordingly.

Figure 3:
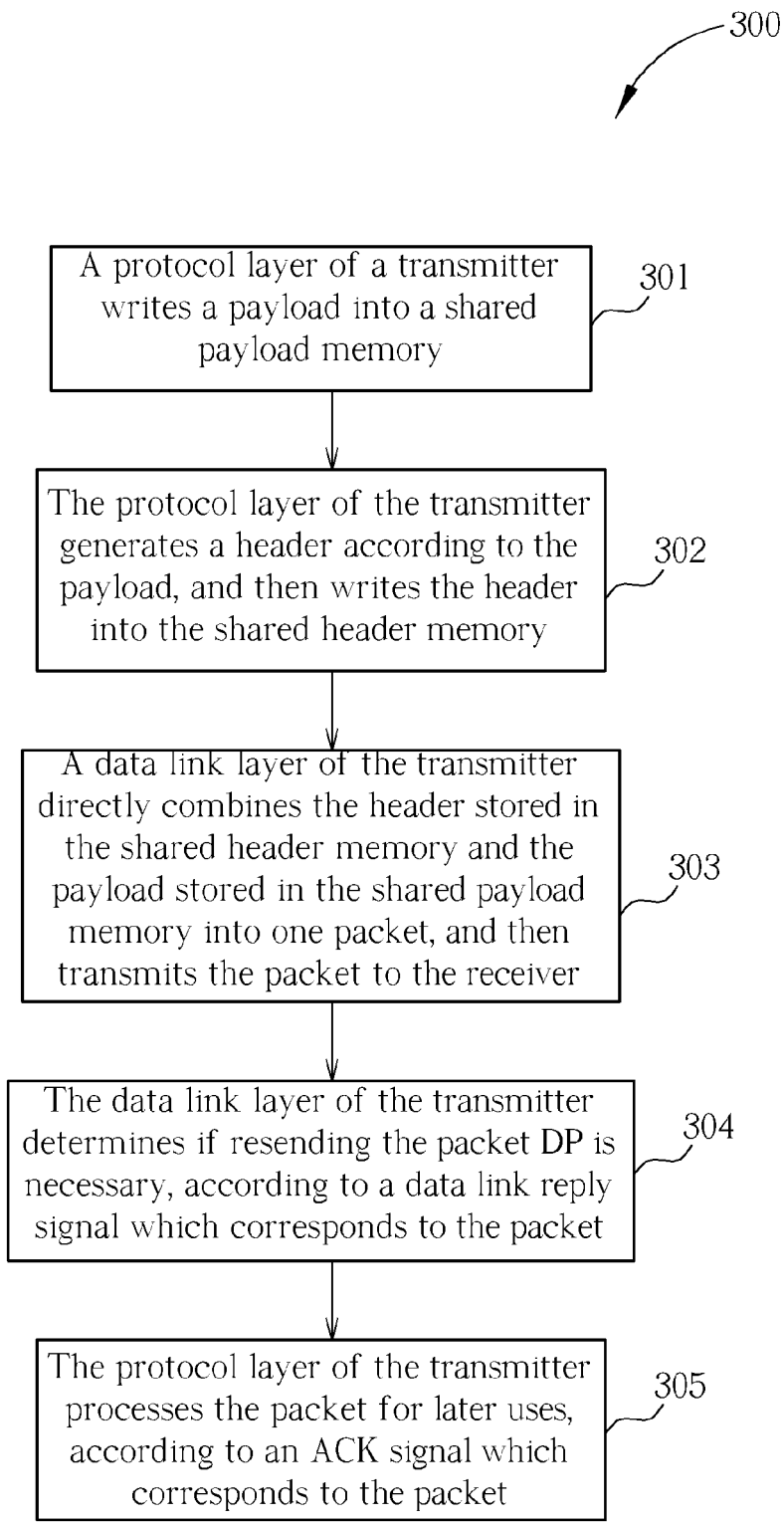
FIG. 3 is a flowchart illustrating the data transfer method for saving memory used to store packets in the USB protocol, according to the second embodiment of the present invention.

Please refer to FIG. 3. FIG. 3 is a flowchart illustrating the data transfer method 300 for saving memory used to store packets in the USB protocol, according to the second embodiment of the present invention. In the data transfer method 300, it is assumed that the transmitter T is a host or a device and the receiver is the host or the device which corresponds to the transmitter T. The transmitter T comprises a physical layer PH, a data link layer DL, a protocol layer PR, a shared header memory SHHM, and a shared payload memory SHPM. The shared payload memory SHPM comprises the payload storing units $PLM_1 \sim PLM_N$ and the shared payload flags $F_{PL1} \sim F_{PLN}$. The payload storing units $PLM_1 \sim PLM_N$ are utilized for storing the payload. Each of the shared payload flags $F_{PL1} \sim F_{PLN}$ is utilized to indicate whether the corresponding payload storing units $PLM_1 \sim PLM_N$ are available for writing in data. For instances, when the shared payload flag $F_{PLK}$ is represented as "write in available", it indicates that the payload storing unit $PLM_K$ of the shared payload memory SHPM is available for writing in data; when the shared payload flag $F_{PLK}$ is represented as "already write in", it indicates that data is already present in the payload storing unit $PLM_K$ of the shared payload memory SHPM and the write in action is prohibited for preventing overwriting the existing data already stored in the payload storing unit $PLM_K$. The shared header memory SHHM comprises the header storing units $HM_1 \sim HM_N$, a waiting-to-send pointer $PTR_{WS}$, an already-sent pointer $PTR_{AS}$ and an already-affirmed pointer $PTR_{AA}$. The header storing units $HM_1 \sim HM_N$ are utilized to store headers. The waiting-to-send pointer $PTR_{WS}$ is utilized to indicate which header storing unit of the header storing units $HM_1 \sim HM_N$ of the receiver R requires the transmitter T to send the stored data to. The already-affirmed pointer $PTR_{AA}$ is utilized to indicate which of the header storing units $HM_1 \sim HM_N$ the transmitter T has sent the stored data to, wherein the transmitter T has also received the ACK signal $S_{ACK}$ from the receiver R, indicating the data of such header storing unit has been correctly received by the receiver R. The steps of data transfer method 300 are described below;

Step 301: The protocol layer PR of the transmitter T writes the payload P into the shared payload memory SHPM;

Step 302: The protocol layer PR of the transmitter T generates the header H according to the payload P, and then writes the header H into the shared header memory SHHM;

Step 303: The data link layer DL of the transmitter T directly combines the header H stored in the shared header memory SHHM and the payload P stored in the shared payload memory SHPM into one packet DP, and then transmits the packet DP to the receiver R;

Step 304: The data link layer DL of the transmitter T determines if resending the packet DP is necessary, according to the data link reply signal $S_{DL}$ transmitted from the receiver R, the data link reply signal $S_{DL}$ corresponds to the packet DP;

Step 305: The protocol layer PR of the transmitter processes the packet DP for later uses, according to the ACK signal $S_{ACK}$ transmitted from the receiver R, wherein the ACK signal $S_{ACK}$ corresponds to the packet DP.

In step 301, when the transmitter T is about to transmit the payload P, the protocol layer PR of the transmitter T searches for the payload storing units that are available for writing in data, according to the shared payload flags $F_{PL1} \sim F_{PLN}$. For instances, assuming the shared payload flag $F_{PLK}$ is represented as "write in available", the transmitter T writes the packet DP into the payload storing unit $PLM_K$ of the shared payload memory SHPM, and then the transmitter T marks the shared payload flag $F_{PLK}$ as "already write in".

In step 302, the protocol layer PR of the transmitter T generates the header H according to the payload P and the payload address information $D_{ADDR\_PL}$ corresponding to the payload storing unit $PLM_K$. For instances, when the payload P is the control command the transmitter T sends to the receiver R, the protocol layer PR configures the end point information EP of the header H to be represented as the control transfer type; when the payload P is the voice or video data the transmitter T sends to the receiver R, the protocol layer PR configures the end point information EP of the header H to be represented as the isochronous transfer type. Other than generating the data (i.e. type information TP, end point information EP, link command word LW, error checking code $CRC_L$ and $CRC_H$, and header sequence parameter HSEQ etc.) comprised by the header H specified by the USB standard, the protocol layer PR also writes the payload address information $D_{ADDR\_PL}$, which indicates the payload address $ADDR_{PL\_K}$ of the payload storing unit $PLM_K$, into the reserved address RA of the header H.

Figure 5:
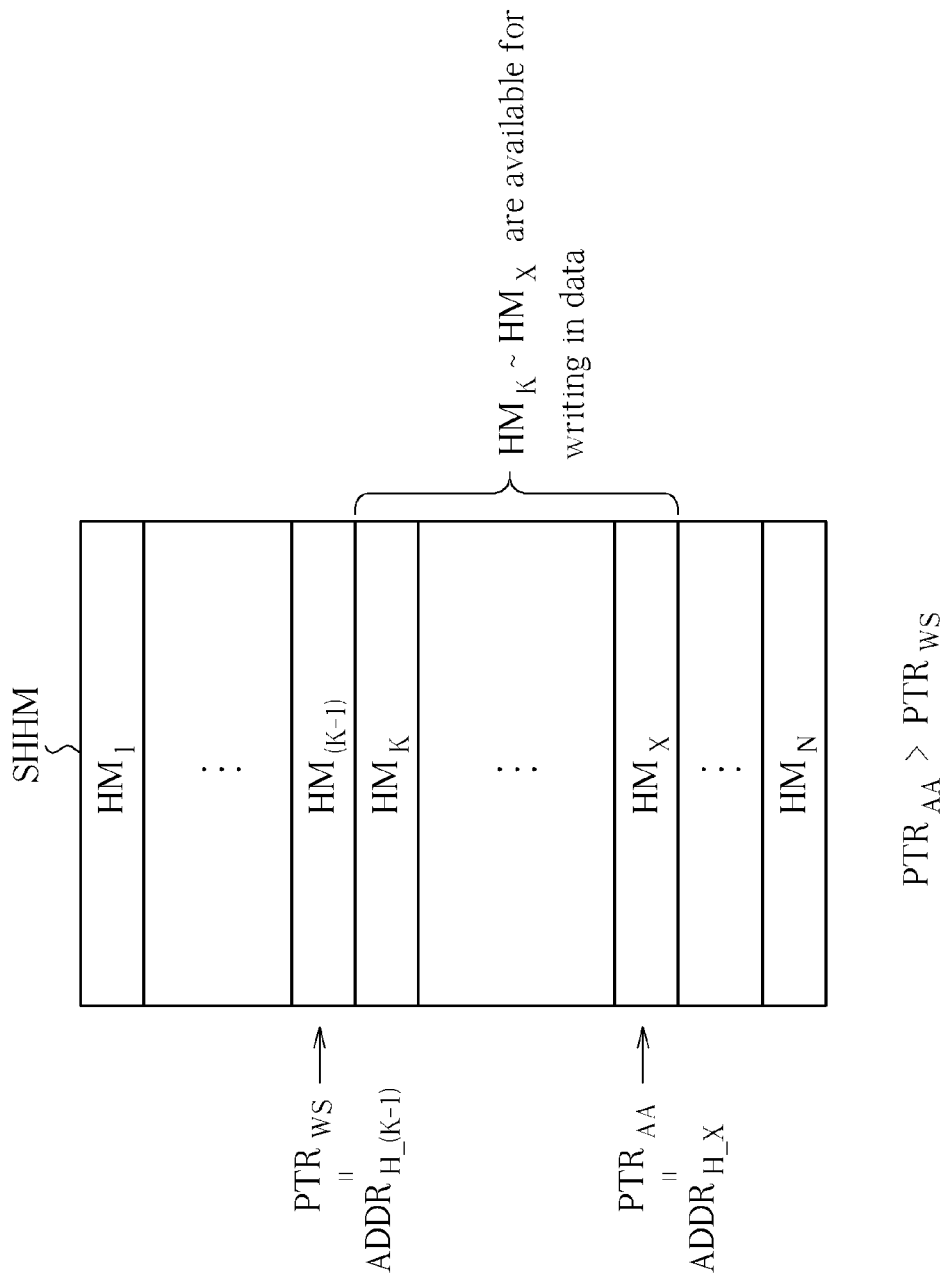
FIG. 5, FIG. 6 and FIG. 7 are diagrams illustrating the header storing unit of the shared header memory when the already-affirmed pointer is larger, smaller or equaled to the waiting-to-send pointer, respectively.
Figure 6:
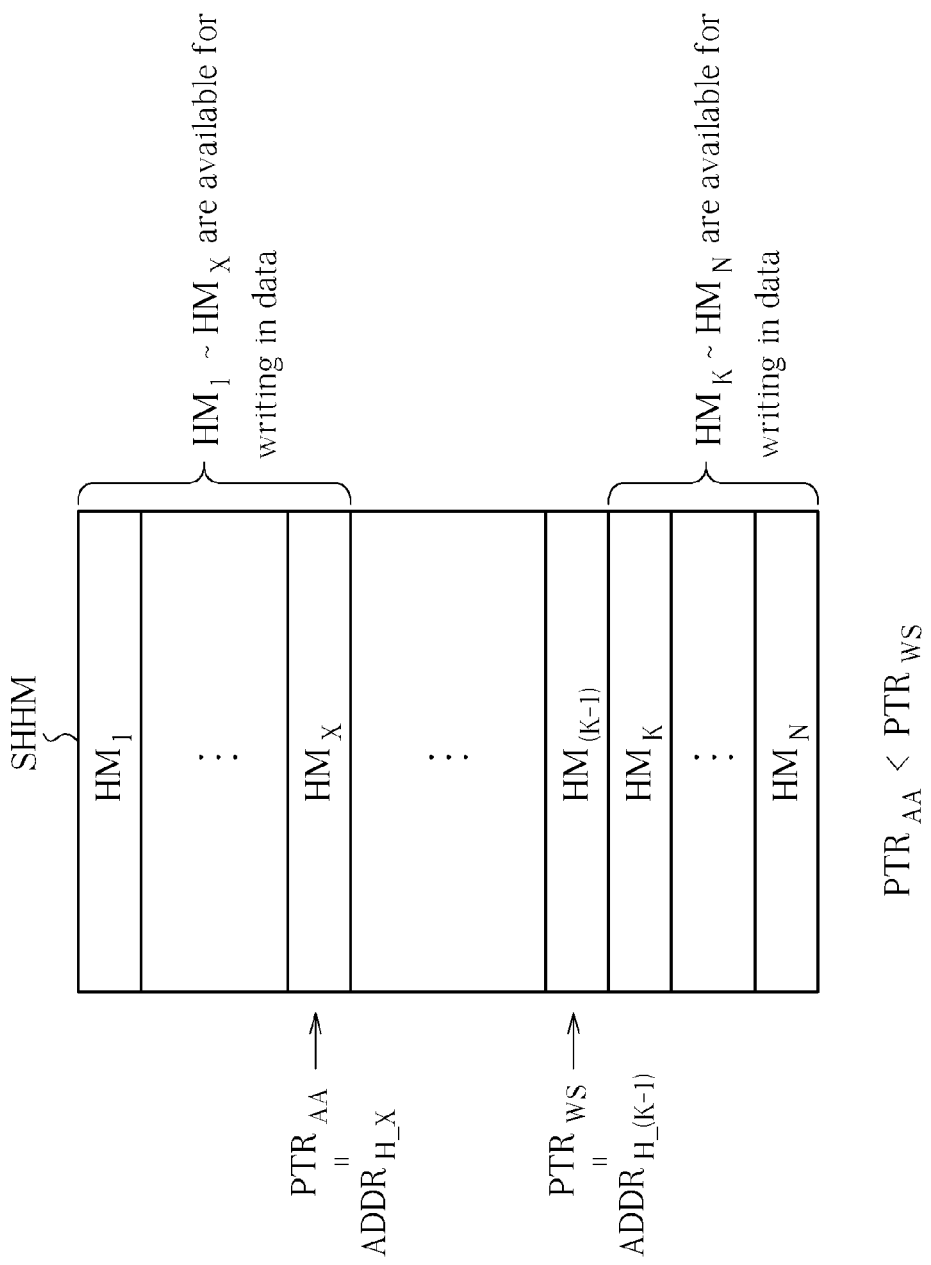
Figure 7:
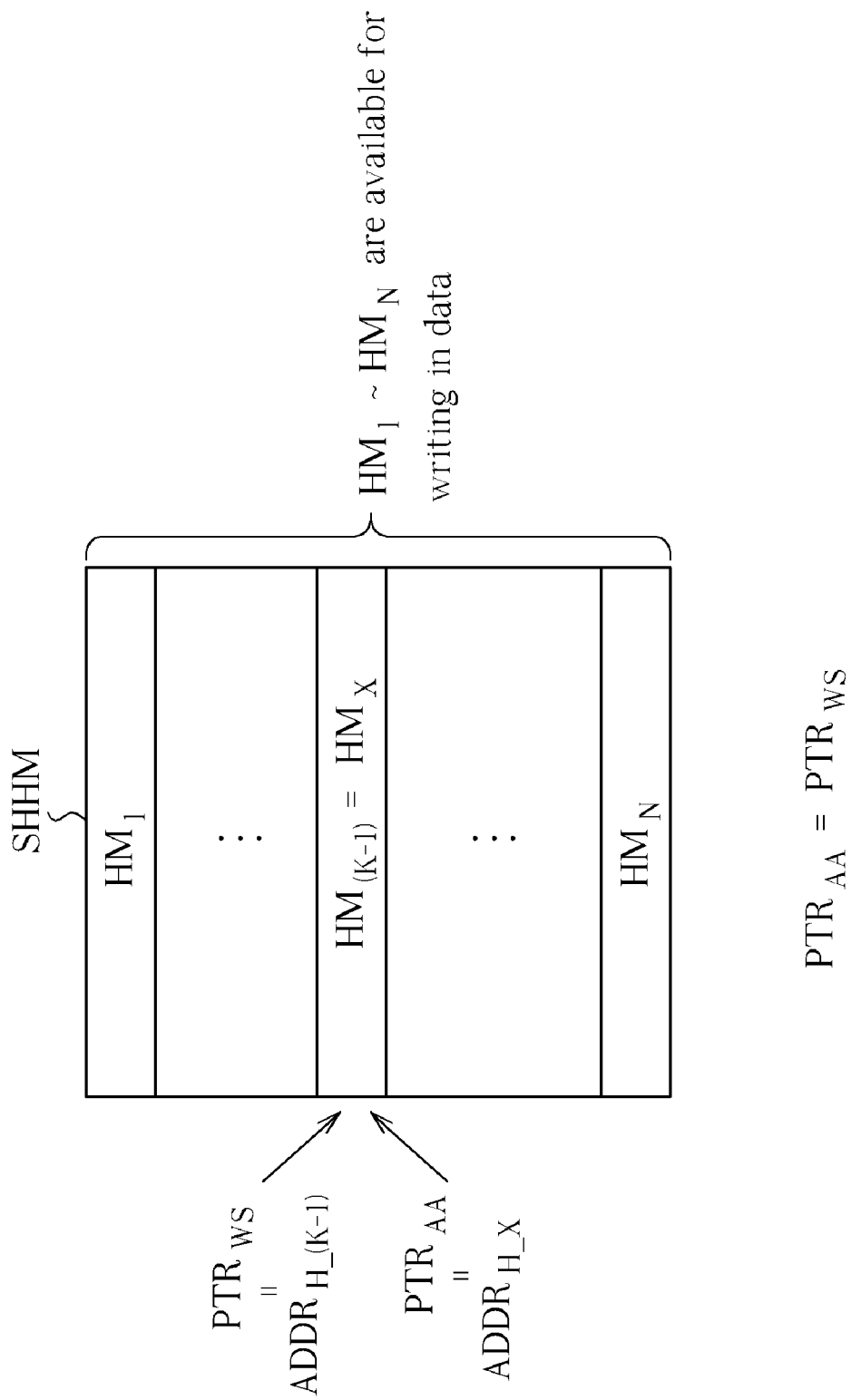
Figure 8:
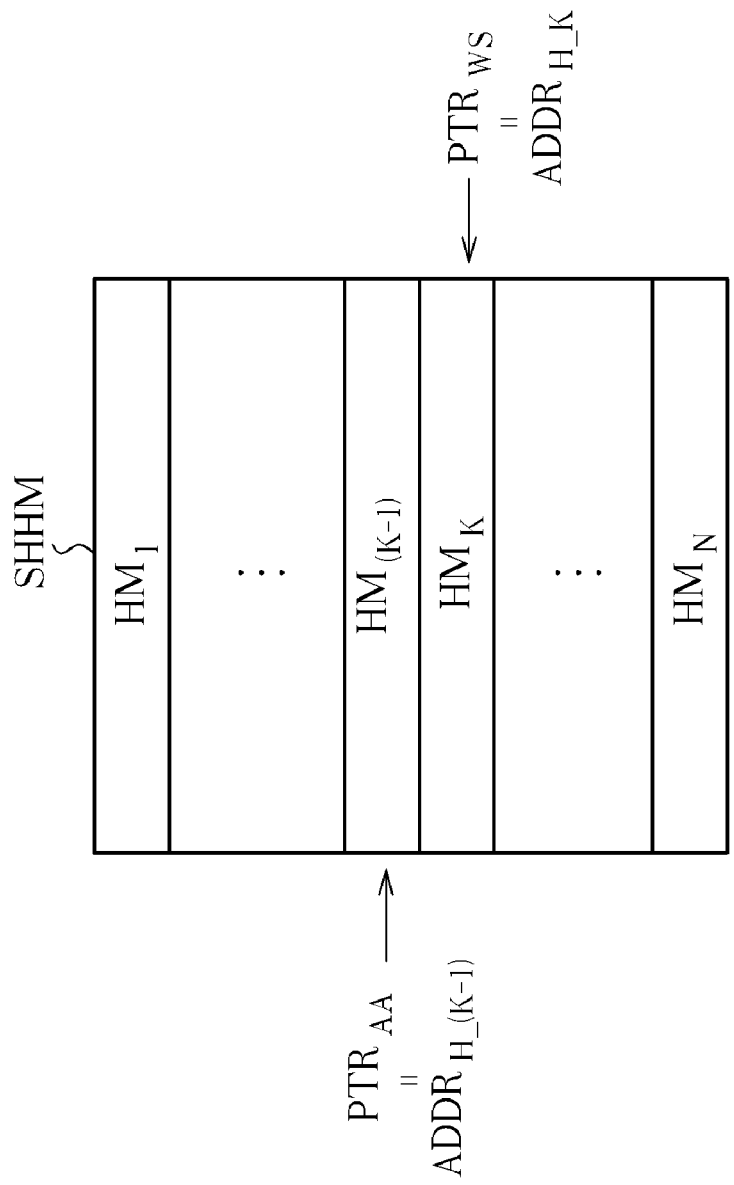
FIG. 8 is a diagram illustrating setting the waiting-to-send pointer to point to the corresponding header address, after the protocol layer writes the header into the header storing unit.

The protocol layer PR of the transmitter T searches for the header storing units of the shared header memory SHHM that are available for writing in data, according to the waiting-to-send pointer $PTR_{WS}$ and the already-affirmed pointer $PTR_{AA}$. Please refer to FIG. 5, FIG. 6 and FIG. 7. FIG. 5, FIG. 6 and FIG. 7 are diagrams illustrating the header storing unit of the shared header memory SHHM when the already-affirmed pointer $PTR_{AA}$ is larger, smaller or equaled to the waiting-to-send pointer $PTR_{WS}$. For instances, it is assumed that the waiting-to-send pointer $PTR_{WS}$ is the header address $ADDR_{H\_(K-1)}$ of the header storing unit $HM_{(K-1)}$, and the already-affirmed pointer $PTR_{AA}$ is the header address $ADDR_{H\_X}$ of the header storing unit $HM_X$. In FIG. 5, the header address $ADDR_{H\_X}$ is larger than the header $ADDR_{H\_(K-1)}$, indicating the header storing units $HM_K \sim HM_X$ are available for writing in data, and other storing units already have data stored. In FIG. 6, the header address $ADDR_{H\_X}$ is smaller than the header $ADDR_{H\_(K-1)}$, indicating the header storing units $HM_1 \sim HM_X$ and $HM_K \sim HM_N$ are available for writing in data and other storing units already have data stored. In FIG. 7, the header address $ADDR_{H\_X}$ equals the header $ADDR_{H\_(K-1)}$, indicating all of the header storing units $HM_1 \sim HM_N$ are available for writing in data. In step 302, assuming the waiting-to-send pointer $PTR_{WS}$ is the header address $ADDR_{H\_(K-1)}$ of the header storing unit $HM_{(K-1)}$, and the already-affirmed pointer $PTR_{AA}$ is also the header address $ADDR_{H\_(K-1)}$, the protocol layer PR can store the header H into the header storing unit $HM_K$, and after the protocol layer PR writes the header H into the header storing unit $HM_K$, the waiting-to-send pointer $PTR_{WS}$ is set to be the header address $ADDR_{H\_K}$ of the header storing unit $HM_K$, as shown in FIG. 8.

Figure 9:
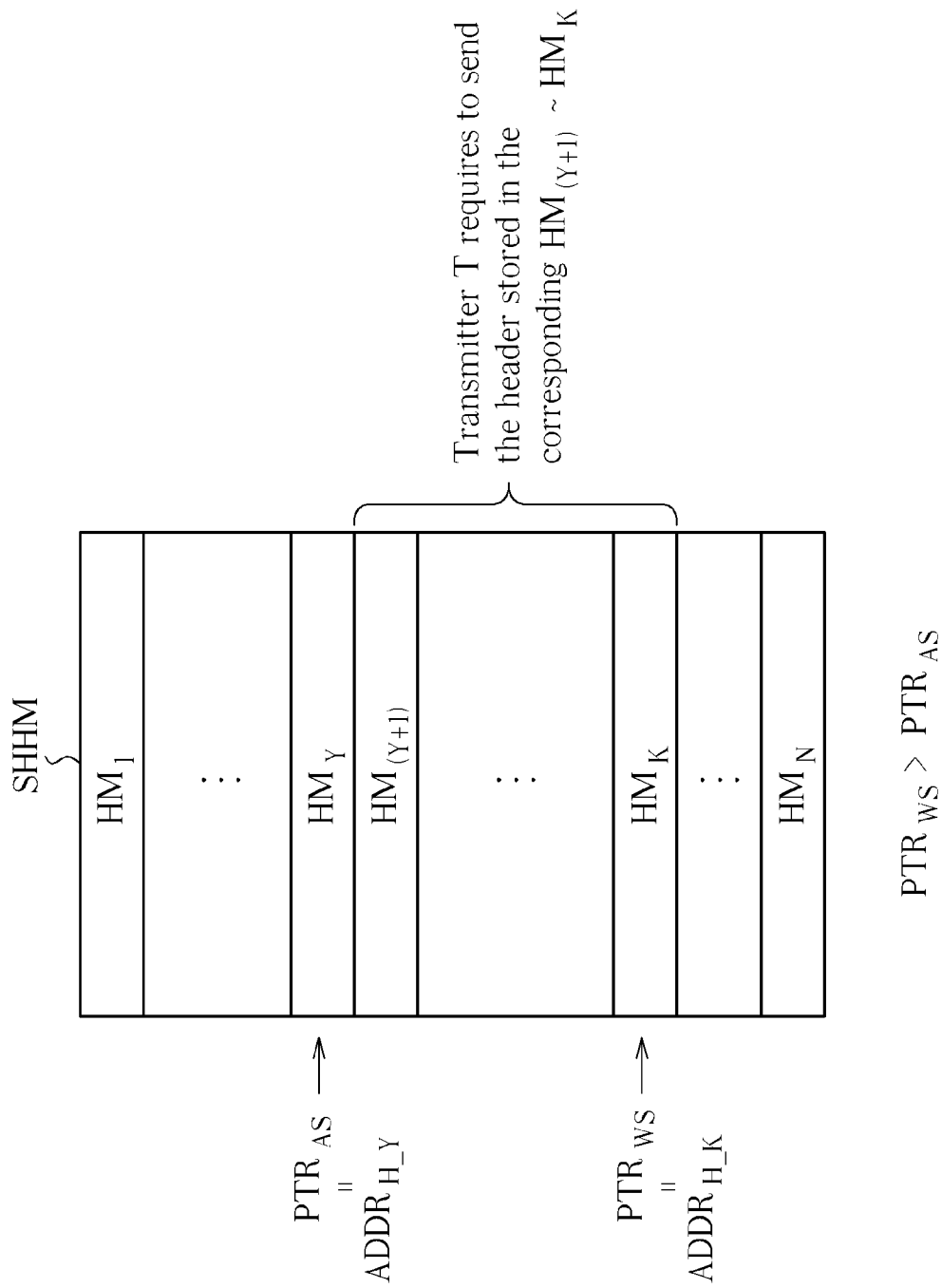
FIG. 9, FIG. 10 and FIG. 11 are diagrams illustrating the data storing units of which the data link layer of the transmitter requires to send the stored data to, when the waiting-to-send pointer is larger, smaller or equaled to the already-sent pointer, respectively.
Figure 10:
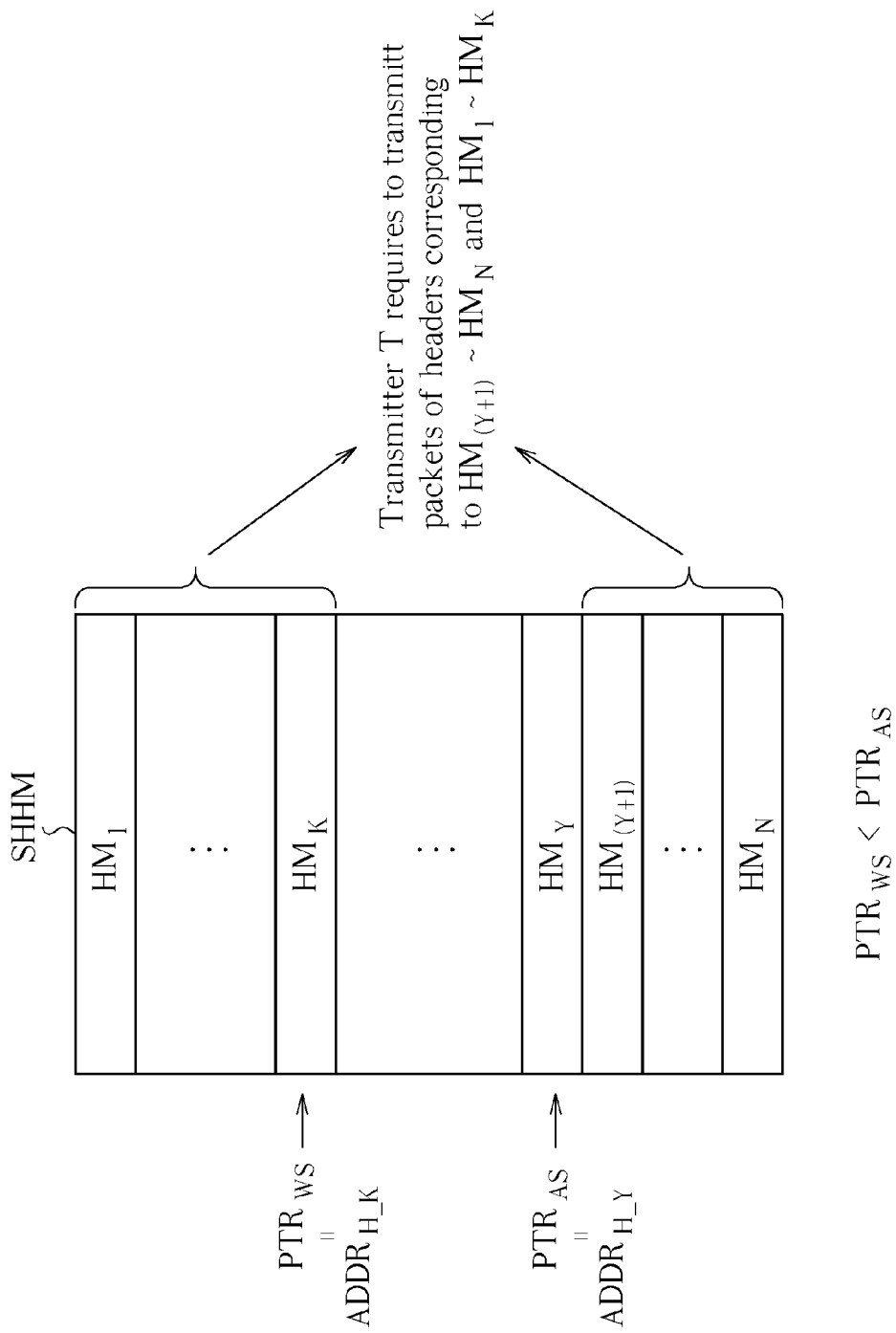
Figure 11:
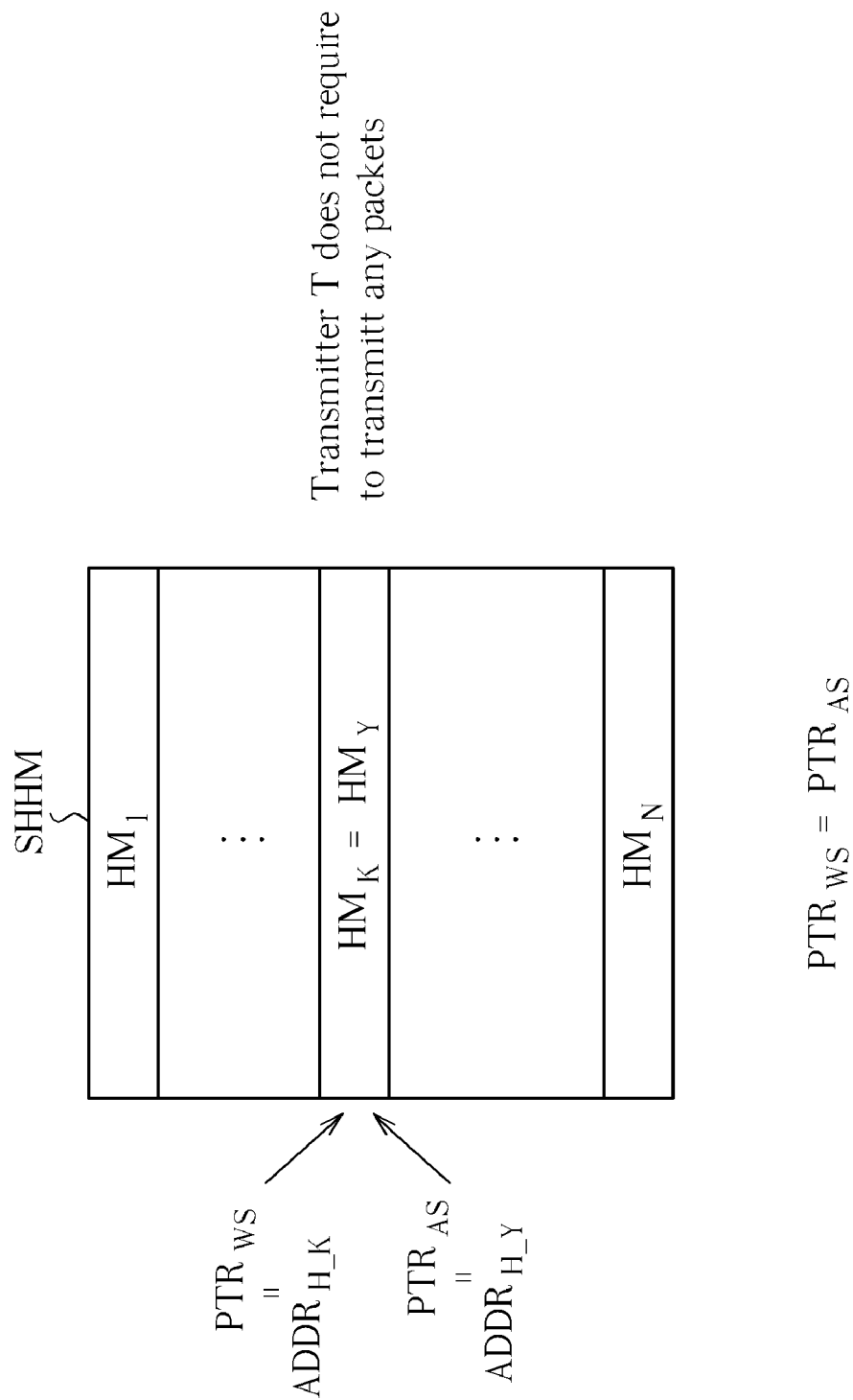

In step 303, according to the waiting-to-send pointer $PTR_{WS}$ and the already-sent pointer $PTR_{AS}$, the data link layer DL of the transmitter T determines which of the data storing units $HM_1 \sim HM_N$ of the shared header memory SHHM requires the data link layer DL of the transmitter T to send the stored data. FIG. 9, FIG. 10 and FIG. 11 are diagrams illustrating the data storing units of which the data link layer DL of the transmitter T requires to send the stored data to, when the waiting-to-send pointer $PTR_{WS}$ is larger, smaller or equaled to the already-sent pointer $PTR_{AS}$. For instances, it is assumed that the address the waiting-to-send pointer $PTR_{WS}$ indicates is the header address $ADDR_{H\_K}$ of the header storing unit $HM_K$, and the already-sent pointer $PTR_{AS}$ is the header address $ADDR_{H\_Y}$ of the header storing unit $HM_Y$. As shown in FIG. 9, if the header address $ADDR_K$ is larger than the header address $ADDR_{H\_Y}$, it indicates that the transmitter T requires to send the packet of the header stored in the corresponding header storing units $HM_{(Y+1)}$~$HM_K$. As shown in FIG. 10, if the header address $ADDR_{H\_K}$ is smaller than the header address $ADDR_{H\_Y}$, it indicates that the transmitter T requires to send the packet of the header stored in the corresponding header storing units $HM_{(Y+1)}$~$HM_N$ and $HM_1$~$HM_K$. As shown in FIG. 11, if the header address $ADDR_{H\_K}$ equals the header address $ADDR_{H\_Y}$, it indicates the transmitter T does not require to send any packets.

After the data link layer DL of the transmitter T determines the packet of the header H to be sent stored in the corresponding header storing unit $HM_K$ according to the waiting-to-send pointer $PTR_{WS}$ and the already-sent pointer $PTR_{AS}$, the data link layer DL of the transmitter T then accesses the header H stored in the header storing unit $HM_K$. The data link layer DL of the transmitter T obtains the payload address $ADDR_{PL\_K}$ of the payload storing unit $PLM_K$ stored in the shared payload memory SHPM, according to the payload address information $D_{ADDR\_PL}$ of the reserved section RA of the header H. This way, the data link layer DL of the transmitter T can access the payload P stored in the payload storing unit $PLM_K$ according to the payload address $ADDR_{PL\_K}$, and then combine the payload P and the header H into a packet DP, for transmitting the packet DP to the receiver R.

In step 304, when the data link reply signal $S_{DL}$ transmitted from the receiver R is the resend signal $S_{LBAD}$, the data link layer DL of the transmitter T can adjust the already-sent pointer $PTR_{AS}$ according to the already-sent pointer $PTR_{AA}$, for the data link layer DL to resend the packet DP. Further details are explained below.

The data link layer DL of the transmitter T determines the header storing unit, among the header storing units $HM_1$~$HM_N$, for which the data has been transmitted but the ACK signal $S_{ACK}$ has not been received for confirming the data has been correctly received. It is assumed that the address the already-affirmed pointer $PTR_{AA}$ indicates is the header address $ADDR_{H\_Z}$ of the header storing unit $HM_Z$, and the address the already-sent pointer $PTR_{AS}$ indicates is the header address $ADDR_{H\_K}$ of the header storing unit $HM_K$. If the header address $ADDR_{H\_K}$ is larger than the header address $ADDR_{H\_Z}$, it means the transmitter T has sent the packet of the header stored in the corresponding header storing unit $HM_z$~$HM_K$, but has not received the ACK signal $S_{ACK}$ from the receiver R to confirm the packet has been received correctly; if the header address $ADDR_{H\_K}$ is smaller than the header address $ADDR_{H\_Z}$, it means the transmitter T has sent the packet of the header stored in the corresponding header storing units $HM_Z$~$HM_N$ and $HM_1$~$HM_K$, but has not received the ACK signal $S_{ACK}$ from the receiver R to confirm the packet has been received correctly; if the header address $ADDR_{H\_K}$ equals the header address $ADDR_{H\_Z}$, it means for all the packets transmitted from the transmitter T, the ACK signal $S_{ACK}$ have been received from the receiver R to confirm the packets have been received correctly.

In step 304, it is assumed that the address the already-affirmed pointer $PTR_{AA}$ indicates is the header address $ADDR_{H\_(K-1)}$ of the header storing unit $HM_{(K-1)}$ and the address the already-sent pointer $PTR_{AS}$ indicates is the header address $ADDR_{H\_K}$ of the header storing unit $HM_K$. At the same time, if the data link reply signal $S_{DL}$ is the resend signal $S_{LBAD}$, the resend signal $S_{LBAD}$ is corresponded to the packet DP of the header H stored in the header storing unit $HM_K$, so the data link layer DL can set the already-sent pointer $PTR_{AS}$ to be the already-affirmed pointer $PTR_{AA}$ (which is equivalent to the header address $ADDR_{H\_(K-1)}$). This way, in step 303 mentioned above, when the data link layer DP determines to send the data stored in certain data storing units from the header storing units $HM_1$~$HM_N$ of the shared header memory SHHM according to the waiting-to-send pointer $PTR_{WS}$ and the already-sent pointer $PTR_{AS}$, since the waiting-to-send pointer $PTR_{WS}$ still points to the header address $ADDR_{H\_K}$ but the already-sent pointer $PTR_{AS}$ is set to point to the header address $ADDR_{H\_(K-1)}$, the data link layer DL will resend the packet DP according to the method similar to the step 303.

In step 305, since the ACK signal $S_{ACK}$ comprises the information corresponds to the header sequence parameter HSEQ of the packet DP, so the protocol layer PR can determine the ACK signal $S_{ACK}$ is corresponded to the packet DP, according to the header sequence parameter HSEQ indicated by the ACK signal $S_{ACK}$.

When the protocol layer PR determines the ACK signal has indicated that the packet DP has been correctly received, the protocol layer PR can adjust the already-affirmed pointer $PTR_{AA}$ for releasing/clearing the header storing unit which stores the header H of the packet DP. It is assumed that the header H of the packet DP is stored in the header storing unit $HM_K$ of the shared header memory SHHM, so the protocol layer PR sets the already-affirmed pointer $PTR_{AA}$ to point to the header address $ADDR_{H\_K}$ of the header storing unit $HM_K$, for indicating that the transmitter T has received the ACK signal $S_{ACK}$ from the receiver R, to confirm the packet DP of the header H stored in the corresponding header storing unit $HM_K$ has been received correctly. Also, from the step 302 mentioned above, it is observed that the protocol layer PR determines whether the header storing units $HM_1$~$HM_N$ are available for writing in data, according to the already-affirmed pointer $PTR_{AA}$ and the waiting-to-send pointer $PTR_{WS}$, so when the protocol layer PR configures the already-affirmed pointer $PTR_{AA}$ to be the header address $ADDR_{H\_K}$ of the header storing unit $HM_K$ of the shared header memory SHHM, the protocol layer PR determines the header storing unit $HM_K$ is available for writing in data (in other words, the header storing unit $HM_K$ of the shared header memory SHHM is released/cleared).

On the other hand, the protocol layer PR can obtain the payload address $ADDR_{PL\_K}$ according to the payload address information $D_{ADDR\_PL}$ of the header H. This way, the protocol layer PR can mark the shared payload flag $F_{PL\_K}$ of the corresponding payload storing unit $PLM_K$ of the shared payload memory SHPM to be "write in available" according to the payload address $ADDR_{PL\_K}$, for releasing/clearing the payload storing unit $PLM_K$ of the shared payload memory SHPM.

Therefore, from the above mentioned description, when the protocol layer PR identifies the ACK signal $S_{ACK}$ has confirmed that the packet DP has been received correctly, the protocol layer PR adjusts the already-affirmed pointer $PTR_{AA}$ and the shared payload flag $F_{PL\_K}$ corresponding to the payload storing unit $PLM_K$ (which is for storing the packet DP) of the shared payload memory SHPL, so as to release/clear the header storing unit $HM_K$ (which is for storing the header H of the packet DP) of the shared header memory SHHM, as well as the payload storing unit $PLM_K$ (which is for storing the payload P of the packet DP) of the shared payload memory SHPM.

When the protocol layer PR identifies the ACK signal $S_{ACK}$ has confirmed that the packet DP has not been received correctly, the protocol layer PR adjusts the already-sent pointer $PTR_{AS}$ according to the already-affirmed pointer $PTR_{AA}$, so the data link layer DL of the transmitter T can resend the packet DP accordingly. The operation is similar to the method specified in step 304 of when the data link layer DL has received the data link reply signal $S_{SL}$ to be the resend signal $S_{LBAD}$; the relative description is omitted hereinafter.

Furthermore, in contrast to the prior art, for the data transfer method 300 of the present invention, when the transmitter T is to transmit the packet DP which corresponds to the payload P, the header H of the packet DP is stored in a header storing unit of the shared header memory SHHM, and the payload P of the packet DP is stored in a payload storing unit of the shared payload memory SHPM. In other words, when the transmitter T is to transmit the corresponding packet DP, the transmitter T only requires the memory of the size of one header (i.e. identical size as the header storing unit $HM_K$) plus one payload (i.e. identical size as the payload storing unit $PLM_K$) for storing the packet DP. In other words, when the transmitter T transmits the packet DP which corresponds to the payload P, the transmitter T only requires the memory of the size of one packet for storing the packet DP. This way, the memory required to store the packet is reduced and the cost can be lowered accordingly.

Figure 4:
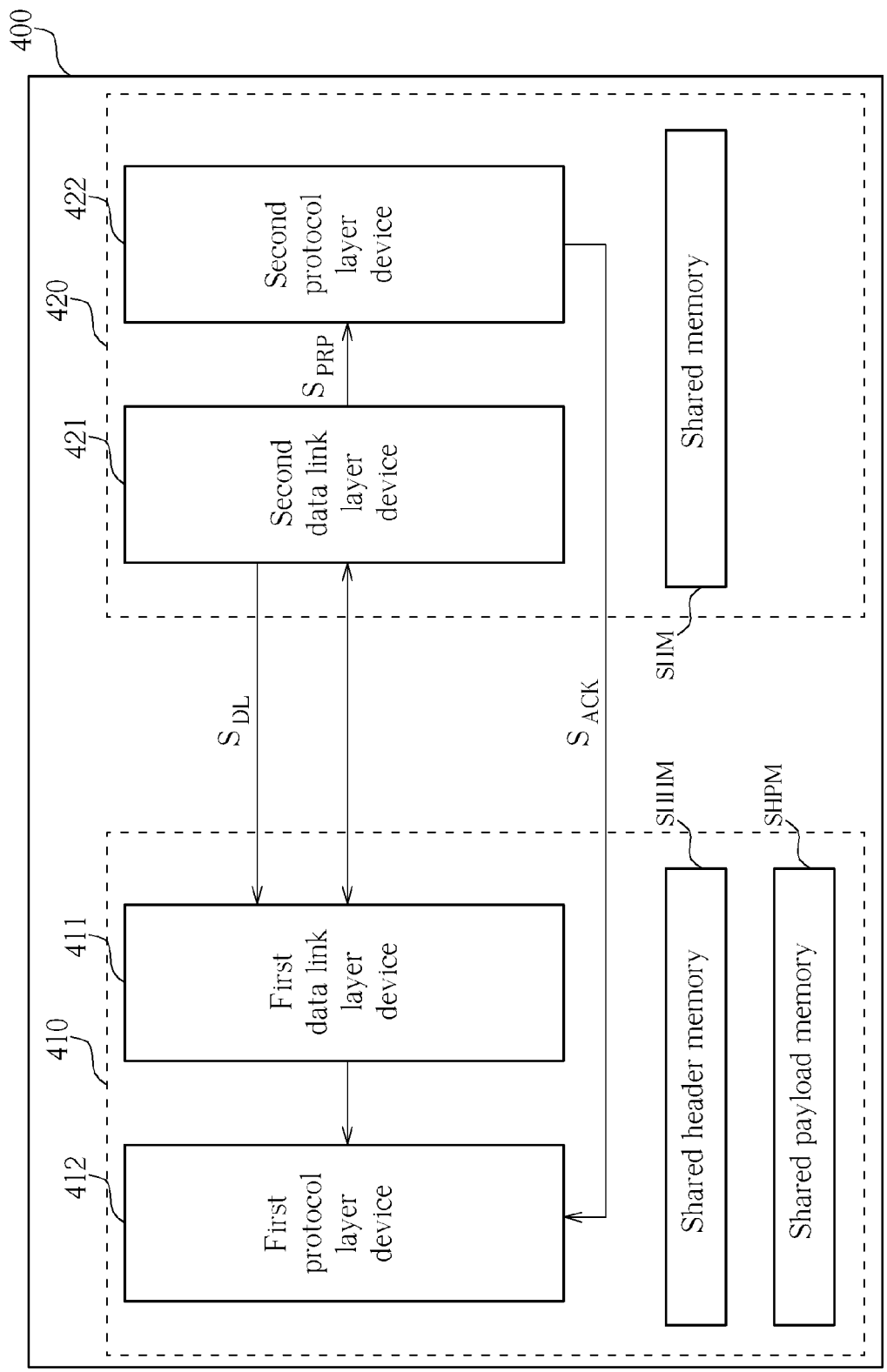
FIG. 4 is a diagram illustrating the memory device for saving memory used to store packets in the USB protocol according to the present invention.

Please refer to FIG. 4. FIG. 4 is a diagram illustrating the memory device 400 for saving memory used to store packets in the USB protocol according to the present invention. The memory device 400 comprises a transmission device 410 and a receiving device 420. The transmission device 410 is equivalent to the transmitter. The transmission device 410 comprises a first data link layer device 411, a first protocol layer device 412, a shared header memory SHHM and a shared payload memory SHPM. The receiving device 420 is equivalent to the receiver. The receiving device 420 comprises a second data link layer device 421, a second protocol layer device 422 and a shared memory SHM. The transmission device 410 and the receiving device 420 of the memory device 400 can be derived from the first and the second embodiment respectively of the present invention.

When the transmission device 410 is to transmit a payload P, the first protocol layer device 412 writes the payload P into the shared payload memory SHPM, and generates the header H according to the payload P, the first protocol layer device 412 then writes the header h into the shared header memory SHHM. Afterwards, the first data link layer device 411 directly combines the header H stored in the shared header memory SHHM and the payload P stored in the shared payload memory SHPM into a packet DP, and then transmits the packet DP to the receiving device 420.

When the receiving device 420 receives the packet DP, the packet DP is stored in the shared memory SHM. The second data link layer device 421 of the receiving device 420 performs error code checking to the header H of the packet DP stored in the shared memory SHM, for obtaining the data link checking result $E_{DL}$ and generating the data link reply signal $S_{DL}$ and the protocol layer processing signal $S_{PRP}$ to the transmission device 410 and the second protocol layer device 422 respectively. When the data link checking result $E_{DL}$ is represented as incorrect, the data link reply signal $S_{DL}$ generated by the second data link layer device 421 is the resend signal $S_{LBAD}$, for notifying the transmission device 410 the data link checking result $E_{DL}$ which corresponds to the packet DP is represented as incorrect, so the first data link layer device 411 of the transmission device 410 can resend the packet DP. When the data link checking result $E_{DL}$ is represented as correct, the data link reply signal $S_{DL}$ generated by the second data link layer device 421 is represented as the confirmation signal $S_{LGOOD}$, for notifying the transmission device 410 that the data link checking result $E_{DL}$ which corresponds to the packet DP is represented as correct, so the second protocol layer device 412 can directly access the packet DP stored in the shared memory SHM for later uses according to the protocol layer processing signal $S_{PRP}$. More specifically, when the second protocol layer device 412 receives the protocol layer processing signal $S_{PRP}$, the second protocol layer device 412 determines if the packet DP is of the isochronous transfer type according to the end point information EP of the header H of the packet DP. When the second protocol layer device 412 determines the packet DP is of the isochronous transfer type, the payload P of the packet DP is received directly; when the second protocol layer device 412 determines the packet DP is not of the isochronous transfer type, cyclic redundancy check is performed to the payload error checking code $CRC_D$ of the payload P of the packet DP for obtaining the payload checking result $E_{PL}$ so the ACK signal $S_{ACK}$ is transmitted to the transmission device 410 for the first protocol layer device 412 of the transmission device 410 to access for later uses.

Figure 12:
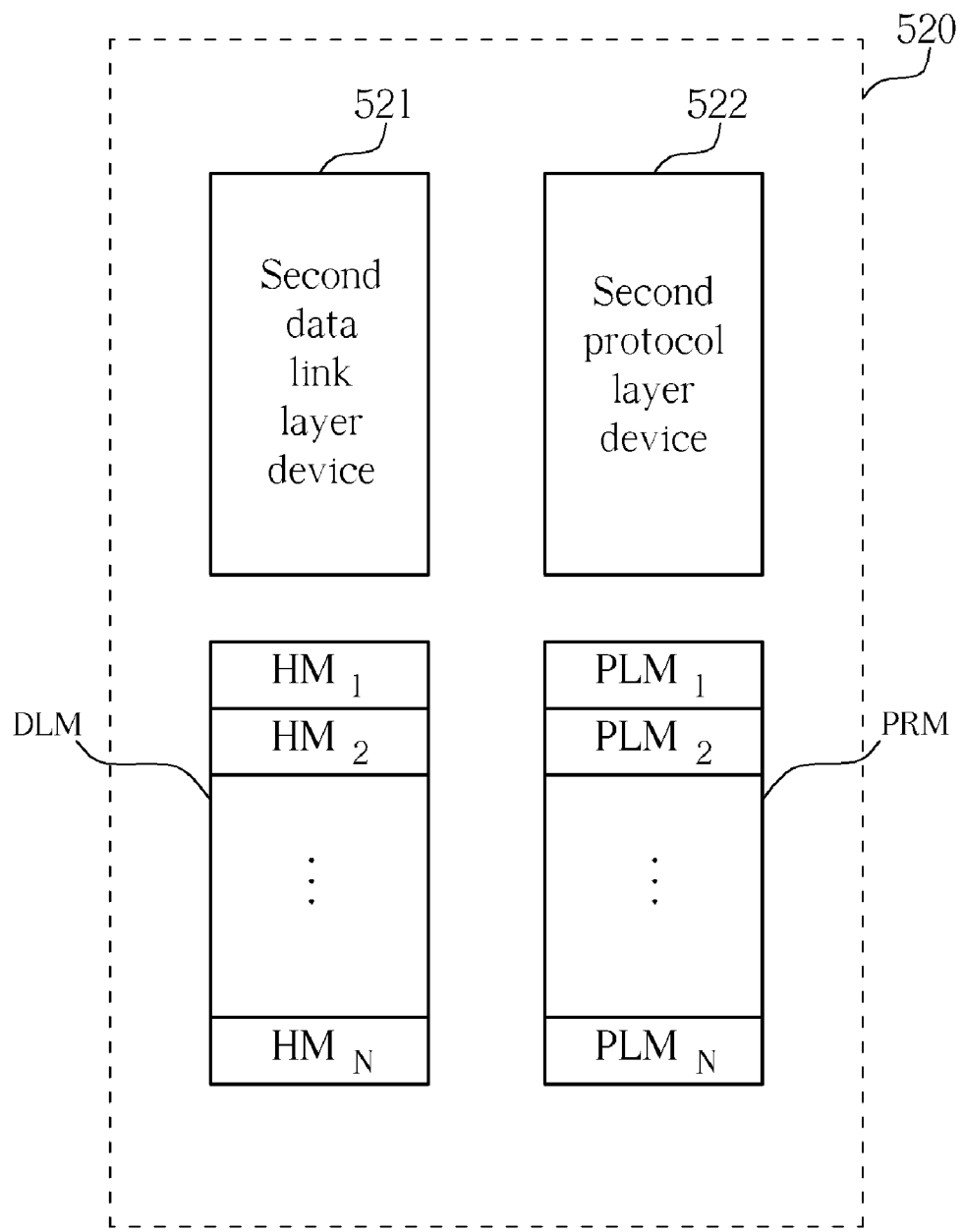
FIG. 12 is a diagram illustrating another embodiment of the receiving device of the present invention.

In addition, the above mentioned receiving device can also be realized according to another embodiment of the data transfer method 200. For instances, the receiving device 520 of another embodiment of the data transfer method 200 can be utilized to replace the above mentioned receiving device 420. Please refer to FIG. 12, the receiving device 520 comprises a data link memory DLM, a protocol memory PRM, a second data link layer device 521 and a second protocol layer device 522. The data link memory DLM comprises the header storing units $HM_1$~$HM_N$. The header storing units $HM_1$~$HM_N$ are utilized to store headers. Each of the header storing units $HM_1$~$HM_N$ comprises the corresponding shared header flags $F_{H1}$~$F_{HN}$. Each of the shared header flags $F_{H1}$~$F_{HN}$ indicates whether each of the corresponding header storing units $HM_1$~$HM_N$ is available for writing in data. The protocol memory PRM comprises the payload storing units $PLM_1$~$PLM_N$. The payload storing units $PLM_1$~$PLM_N$ are utilized to store the payload. Each of the payload storing units $PLM_1$~$PLM_N$ comprises the corresponding shared payload flags $F_{PL1}$~$F_{PLN}$. Each of the shared payload flags $F_{PL1}$~$F_{PLN}$ is utilized to indicate whether each of the corresponding payload storing units $PLM_1$~$PLM_N$ is available for writing in data. In other words, the data link memory DLM is utilized to store the header of the packet but not the payload of the packet; the protocol memory PRM is utilized to store the payload of the packet but not the header of the packet. The second data link layer device 521 is electrically connected to the data link memory DLM. The second protocol layer device 522 is electrically connected to the protocol memory PRM. The operation principle of the data communication between the receiving device 520 and the transmission device 410 is similar to that of between the receiving device 420 and the transmission device 410; the relative description is omitted hereinafter.

In conclusion, the present invention discloses a data transfer method, when the receiver has received the packet, the packet is stored in the shared memory and the data link layer performs error code checking to the header of the packet stored in the shared memory for obtaining the data link checking result, so the protocol layer processing signal is transmitted to the protocol layer accordingly. This way, the protocol layer can directly access the packet stored in the shared memory according to the protocol layer processing signal. By utilizing the data transfer method of the present invention, when the receiver is to receive the packet, the receiver only requires the memory of the size of the packet for storing the packet. In addition, the present invention further discloses a data transfer method, when the transmitter is to transmit the payload, the protocol layer of the transmitter writes the payload into the shared payload memory. The protocol layer generates the corresponding header according to the payload and writes the corresponding header into the shared header memory, so the data link layer of the transmitter can directly combine the header stored in the shared header memory and the payload stored in the shared payload memory into a packet, and transmits the packet accordingly. By utilizing the data transfer method of the present invention, when the transmitter is to transmit the corresponding payload, the transmitter only requires the memory of the size of one packet for storing the packet of corresponding payload. Consequently, the memory required to store the packet is reduced and the cost lowered accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data transfer method for saving memory when storing packets in USB (Universal Serial Bus) protocol, comprising:
    a receiver receiving a packet transmitted from a transmitter, and storing the packet in a shared memory;
    a data link layer of the receiver performing error code checking to a header of the packet stored in the shared memory, for obtaining a data link checking result and then accordingly transmitting a protocol layer processing signal to a protocol layer of the receiver; and
    the protocol layer of the receiver directly processing the packet stored in the shared memory, according to the protocol layer processing signal.

2. The data transfer method of claim 1, wherein the data link layer of the receiver performs error code checking to the header of the packet stored in the shared memory, for obtaining the data link checking result and then accordingly transmitting the protocol layer processing signal to the protocol layer of the receiver comprises:
    performing cyclic redundancy check to a header error checking code of the header of the packet, for obtaining a header checking result;
    performing cyclic redundancy check to a link command word error checking code of the header of the packet, for obtaining a link command word checking result; and
    obtaining the data link checking result according to the header checking result and the link command word checking result; and
    transmitting the protocol layer processing signal to the protocol layer of the receiver when the data link checking result is represented as correct, and then transmitting a confirmation signal to the transmitter;
    wherein the confirmation signal is for notifying the transmitter that the data link checking result at the receiver for the packet transmitted from the transmitter is represented as correct.

3. The data transfer method of claim 2, wherein the data link layer of the receiver performing error code checking to the header of the packet stored in the shared memory, for obtaining the data link checking result and then accordingly transmitting the protocol layer processing signal to the protocol layer of the receiver further comprises:
    when the data link checking result is represented as incorrect, transmitting a resend signal to the transmitter;
    wherein the resend signal is for notifying the transmitter that the data link checking result at the receiver for the packet transmitted from the transmitter is represented as incorrect.

4. The data transfer method of claim 3, wherein obtaining the data link checking result according to the header checking result and the link command word checking result comprises:
    when the header checking result and the link command word checking result are both correct, the data link checking result is represented as correct; and
    when one of the header checking result and the link command word checking result is incorrect, the data link checking result is represented as incorrect.

5. The data transfer method of claim 1, wherein the protocol layer of the receiver directly processing the packet stored in the shared memory, according to the protocol layer processing signal comprises:
    obtaining an address of the shared memory according to the protocol layer processing signal;
    accessing the packet stored in the shared memory according to the address of the shared memory; and
    receiving a payload of the packet for processing according to an end point information of the packet of the packet.

6. The data transfer method of claim 5, wherein receiving the payload of the packet for processing according to the end point information of the packet of the packet comprises:
    when the end point information indicates the packet is of an isochronous transfer type, receiving the payload of the packet for processing; and
    when the endpoint indicates the packet is not of the isochronous transfer type, performing cyclic redundancy check to a payload error checking code of the payload of the packet stored in the shared memory, for obtaining a payload checking result and then transmitting a ACK signal to the transmitter accordingly.

7. The data transfer method of claim 1, wherein the receiver is a host or a device, and the transmitter is a host or a device corresponding to the receiver.

8. A data transfer method for saving memory when storing packets in USB (Universal Serial Bus) protocol, comprising:
    a protocol layer of a transmitter writing a payload into a shared payload memory;
    the protocol layer of the transmitter generating a header according to the payload, and then writing the header into a shared header memory; and
    a data link layer of the transmitter directly combining the header stored in the shared header memory and the payload stored in the shared payload memory into a packet, and then transmitting the packet to a receiver.

9. The data transfer method of claim 8, wherein the protocol layer of the transmitter writing the payload into the shared payload memory comprises:
    writing the payload into the shared payload memory according to a shared payload flag which corresponds to the shared payload memory; and
    marking the shared payload flag which corresponds to the shared payload memory as already writing in.

10. The data transfer method of claim 9, wherein the protocol layer of the transmitter generating the header according to the payload, and then writing the header into the shared header memory comprises:
    determining whether the shared header memory is available for writing in data, according to a waiting-to-send pointer and a already-affirmed pointer;
    generating the header according to the payload and a payload address information corresponding to the shared payload memory, and then storing the header in the shared header memory; and
    adjusting the waiting-to-send pointer according to a header address corresponding to the shared header memory;

wherein the payload address information corresponding to the shared payload memory is for indicating a payload address of the shared payload memory.

11. The data transfer method of claim 10, wherein the payload address information is a reserved section stored in the header.

12. The data transfer method of claim 10, wherein the data link layer of the transmitter directly combining the header stored in the shared header memory and the payload stored in the shared payload memory into the packet, and then transmitting the packet to the receiver comprises:
the data link layer of the transmitter determining whether to transmit the packet of the header stored in the shared header memory or not, according to the corresponding waiting-to-send pointer and an already-sent pointer;
the data link layer of the transmitter obtaining the payload address information according to the header and then obtaining the payload stored in the shared payload memory accordingly; and
the data link layer of the transmitter combines the header and the payload into the packet and transmitting the packet to the receiver.

13. The data transfer method of claim 12, the data transfer method further comprising:
the data link layer of the transmitter determining whether to resend the packet according to a data link replying signal corresponding to the packet transmitted from the receiver; and
the protocol layer of the transmitter processing the packet according to an ACK signal corresponding to the packet transmitted from the receiver.

14. The data transfer method of claim 13, wherein the data link layer of the transmitter determining whether to resend the packet according to a data link replying signal corresponding to the packet transmitted from the receiver comprises:
when the data link reply signal is the resend signal, adjusting the already-sent pointer according to the already-affirmed pointer, so the data link layer of the transmitter resends the packet accordingly.

15. The data transfer method of claim 14, wherein when the data link reply signal is the resend signal, adjusting the already-sent pointer according to the already-affirmed pointer, so the data link layer of the transmitter resends the packet accordingly comprises:
the data link layer of the transmitter determining whether to transmit the packet corresponding to the header stored in the shared header memory, according to the waiting-to-send pointer and the already-sent pointer;
the data link layer of the transmitter obtaining the payload address information according to the header, and then obtaining the payload stored in the shared payload memory accordingly; and
the data link layer of the transmitter combining the header and the payload into the packet and then transmitting the packet to the receiver.

16. The data transfer method of claim 13, wherein the protocol layer of the transmitter processing the packet according to the ACK signal corresponding to the packet transmitted from the receiver comprises:
when the ACK signal indicating the packet has been received correctly, adjusting the already-affirmed pointer and the shared payload flag which corresponds to the shared payload memory according to the ACK signal, for releasing the shared header memory and the shared payload memory; and
when the ACK signal indicating the packet has not been received correctly, adjusting the already-sent pointer according to the already-affirmed pointer, for the data link layer of the transmitter to resend the packet accordingly.

17. The data transfer method of claim 16, wherein when the ACK signal indicating the packet has been received correctly, adjusting the already-affirmed pointer and the shared payload flag which corresponds to the shared payload memory according to the ACK signal, for releasing the shared header memory and the shared payload memory comprises:
obtaining the header address of the shared header memory and the header stored in the shared header memory, according to a header sequence parameter stored in the ACK signal;
obtaining the payload address of the shared payload memory according to the payload address information of the header;
adjusting the already-affirmed pointer according to the header address of the shared header memory, for releasing the shared header memory; and
marking the shared payload flag which corresponds to the shared payload memory to be already write in according to the payload address, for releasing the shared payload memory.

18. The data transfer method of claim 16, wherein when the ACK signal indicating the packet has not been received correctly, adjusting the already-sent pointer according to the already-affirmed pointer, for the data link layer of the transmitter to resend the packet accordingly comprises:
the data link layer of the transmitter determining whether to transmit the packet corresponding to the header stored in the shared header memory, according to the waiting-to-send pointer and the already-sent pointer;
the data link layer of the transmitter obtaining the payload address information according to the header, and then obtaining the payload stored in the shared payload memory accordingly; and
the data link layer of the transmitter combining the header and the payload into the packet and then transmitting the packet to the receiver.

19. The data transfer method of claim 18, wherein the transmitter is a host or a device, and the receiver is a host or a device corresponding to the transmitter.

20. A device for saving memory when storing packets in USB (Universal Serial Bus) protocol, comprising:
a transmitting device, comprising:
a shared header memory;
a shared payload memory;
a first protocol layer device, for generating a heater according to a payload, and then storing the payload in the shared payload memory, as well as storing the header in the shared header memory; and
a first data link layer device, for directly combining the header stored in the shared header memory and the payload stored in the shared payload memory into a packet, and then transmitting the packet; and
a receiving device, for receiving the packet, the receiving device comprising:
a shared memory, for storing the packet;
a second data link layer device, for performing error code checking to the header of the packet stored in the shared memory, for generating a data link checking result, and then transmitting a data link reply signal to the transmitting device as well as generating a protocol layer processing signal according to the data link checking result; and
a second protocol layer device, for determining whether the packet stored in the shared memory is of an isochronous transfer type, according to the protocol layer processing signal and an end point information of the header of the packet stored in the shared memory.

21. The device of claim 20, wherein when the second protocol layer device determines the packet is of the isochronous transfer type, the payload of the packet is received directly; when the second protocol layer device determines the packet is not of the isochronous transfer type, cyclic redundancy check is performed to a payload error checking code of the payload of the packet for obtaining a payload checking result, and an ACK signal is transmitted to the transmitting device accordingly for the first protocol layer of the transmitting device to process.

22. The device of claim 20, wherein when the data link checking result is represented as incorrect, the data link replying signal is a resend signal for the first data link layer of the transmitting device to resend the packet; when the data link checking result is represented as correct, the data link checking result is a confirmation signal and the second data link device transmits the protocol processing signal to the second protocol layer device.

23. A receiving device for saving memory, the receiving device receiving a packet according to a communication protocol, the packet comprising a header and a payload, the receiving device comprising:
a shared memory, comprising a plurality of packet storing units, a first packet storing unit of the plurality of packet storing units stores the packet and the first packet storing unit corresponds to a first memory address;
a second data link layer device, electrically connected to the shared memory, the second data link layer device reads the packet stored in the first packet storing unit according to the first memory address; and
a second protocol layer device, electrically connected to the shared memory, the second protocol layer device accesses the packet stored in the first packet storing unit according to the first memory address.

24. The receiving device of claim 23, wherein the first packet storing unit comprises a first flag for indicating whether the first packet storing unit is available for writing in data.

25. The receiving device of claim 23, wherein the second data link layer device performs error code checking according to the header of the packet for generating a data link checking result, and then transmits a data link reply signal to a transmitting device which corresponds to the receiving device according to the data link checking result.

26. The receiving device of claim 25, wherein the second data link layer device selectively generates a protocol layer processing signal to the second protocol layer device according to the data link checking result, the second protocol layer device receives the protocol layer processing signal and then determines whether the packet stored in the shared memory is of an isochronous transfer type according to an end point information of the header of the packet.

27. The receiving device of claim 26, wherein the protocol layer processing signal comprises the first memory address, for the second protocol layer device to access the packet stored in the first packet storing unit according to the first memory address.

28. A receiving device for saving memory, the receiving device receiving a packet according to a communication protocol, the packet comprising a header and a payload, the receiving device comprising:
a data link memory, comprising a plurality of header storing units, a first header storing unit of the plurality of header storing units stores the header of the packet but not the payload of the packet, and the first header storing unit corresponds to a second memory address;
a protocol memory, comprising a plurality of payload storing units, a first payload storing unit of the plurality payload units stores the payload but not the header of the packet, and the first payload storing unit corresponds to a third memory address;
a second data link layer device, electrically connected to the data link memory, the second data link layer device accesses the header of the packet according to the second memory address; and
a second protocol layer device, electrically connected to the protocol memory, the second protocol layer device accesses the payload of the third memory address.

29. The receiving device of claim 28, wherein the first header storing unit comprises a second flag for indicating whether the first header storing unit is available for writing in data, and the first payload storing unit comprises a third flag for indicating whether the first payload storing unit is available for writing in data.

30. The receiving device of claim 28, wherein the second data link layer device performs error code checking according to the header of the packet for generating a data link checking result, and then transmits a data link replay signal to a transmitting device corresponds to the receiving device according to the data link checking result.

31. The receiving device of claim 30, wherein the second data link layer device selectively generates a protocol layer processing signal to the second protocol layer device according to the data link checking result, the second protocol layer device receives the protocol layer processing signal and then determines whether the packet is of an isochronous transfer type according to an end point information of the header of the packet.

32. The receiving device of claim 31, wherein the protocol layer processing signal comprises the second memory address, for the second protocol layer device to access the header of the packet stored in the first header storing unit according to the second memory address.

33. The receiving device of claim 31, wherein the protocol layer processing signal comprises the third memory address, wherein when the second protocol layer device determines the packet is of the isochronous transfer type, the second protocol layer device directly accesses the payload of the packet stored in the first payload storing unit without performing cyclic redundancy check to a payload error checking code of the payload; when the second protocol layer device determines the packet is not of the isochronous transfer type, the second protocol layer device accesses the payload of the packet stored in the first payload storing unit according to the third memory address, and then performs cyclic redundancy check to the payload error checking code of the payload, for obtaining a payload checking result, then an ACK signal is accordingly transmitted to the transmitting device, for a first protocol layer of the transmitting device to process.

34. A transmitting device for saving memory, the transmitting device transmitting a packet according to a communication protocol, the packet comprising a header and a payload, the transmitting device comprising:
a first protocol layer device, for generating the header of the packet according to the payload of the packet;
a shared header memory, electrically connected to the first protocol layer device, the shared header memory comprise a plurality of shared header storing units, a first shared header storing unit of the plurality of shared header storing units stores the header of the packet but not the payload of the packet, and the first shared header storing unit corresponds to a fourth memory address;

a shared payload memory, electrically connected to a first protocol layer device, the shared payload memory comprises a plurality of shared payload storing units, a first shared payload storing unit of the plurality of shared payload storing units stores the payload of the packet but not the header of the packet, and the first shared payload storing unit corresponds to a fifth memory address; and a first data link layer device, electrically connected to the shared payload memory and the shared header memory, the first data link layer device combines the header and the payload into the packet according to the fourth memory address and the fifth memory address, and then transmits the packet to a receiving device corresponding to the transmitting device.

35. The transmitting device of claim 34, wherein the first shared payload storing unit comprises a fourth flag for indicating whether the first shared payload storing unit is available for writing in data.

* * * * *